United States Patent [19]

Sena

[11] 4,454,829

[45] Jun. 19, 1984

[54] AUTOMATIC PLANT SETTING APPARATUS

[76] Inventor: Gil A. Sena, 1491 Black Rd., Santa Maria, Calif. 93454

[21] Appl. No.: 368,270

[22] Filed: Apr. 14, 1982

Related U.S. Application Data

[63] Continuation of Ser. No. 261,368, May 7, 1981, abandoned.

[51] Int. Cl.³ ............................................. A01C 11/00
[52] U.S. Cl. ........................................ 111/2; 414/417
[58] Field of Search .......................... 111/2, 3; 47/85; 414/417

[56] References Cited

U.S. PATENT DOCUMENTS

| | | | |
|---|---|---|---|
| 2,333,945 | 11/1943 | Mast et al. | 111/3 |
| 3,180,505 | 4/1965 | Maurer | 221/81 X |
| 3,363,780 | 1/1968 | D'Andrea et al. | 221/81 X |
| 3,374,752 | 3/1968 | Shirozu | 111/2 |
| 3,446,164 | 5/1969 | Huang et al. | 111/3 |
| 3,458,072 | 7/1969 | Romeo | 414/417 |
| 3,524,419 | 8/1970 | Middleton et al. | 111/2 |
| 3,712,252 | 1/1973 | Huang | 111/2 |
| 3,757,468 | 9/1973 | Shirouzu | 111/3 X |
| 3,844,428 | 10/1974 | Olsen | 414/417 X |
| 3,858,746 | 1/1975 | Hirota | 414/417 X |
| 3,926,323 | 12/1975 | Frank et al. | 414/417 |
| 4,050,188 | 9/1977 | van Wingerden | 47/85 |
| 4,132,337 | 1/1979 | Masuda et al. | 111/2 X |
| 4,156,395 | 5/1979 | Edwards et al. | 111/3 |
| 4,167,911 | 9/1979 | Masuda et al. | 111/3 |
| 4,248,014 | 2/1981 | Williames | 47/86 |
| 4,251,951 | 2/1981 | Heinstedt | 47/39 |
| 4,289,080 | 9/1981 | Penley | 111/3 |

FOREIGN PATENT DOCUMENTS

| | | | |
|---|---|---|---|
| 809260 | 7/1951 | Fed. Rep. of Germany | 111/3 |
| 2330600 | 5/1974 | Fed. Rep. of Germany | 111/2 |
| 337412 | 10/1930 | United Kingdom | 111/3 |
| 1219366 | 1/1971 | United Kingdom | 111/3 |
| 1557004 | 12/1979 | United Kingdom | 111/3 |

Primary Examiner—James R. Feyrer

[57] ABSTRACT

Apparatus for automatically dropping plant seedlings at measured intervals into a furrow behind a plow point which digs the furrow as the apparatus is moved over a ground surface. The seedlings are contained in a multiple compartment tray which is automatically advanced as each plant is discharged, so as to position the next plant for discharge. The tray contains multiple rows of seedling compartments, and as each row is exhausted of its contained seedlings, the tray is automatically advanced to position another row of compartments for discharge of the seedlings contained therein.

7 Claims, 19 Drawing Figures

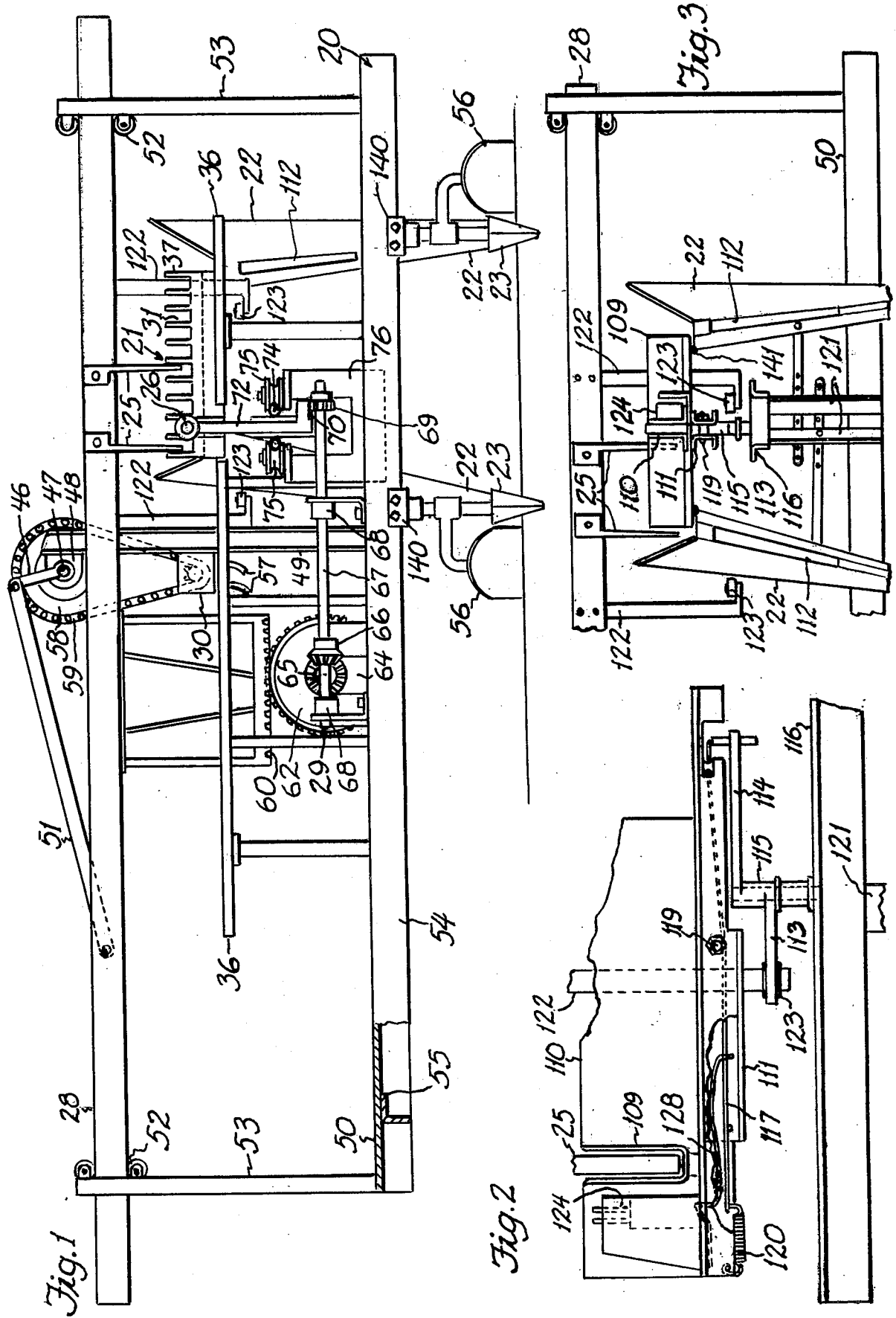

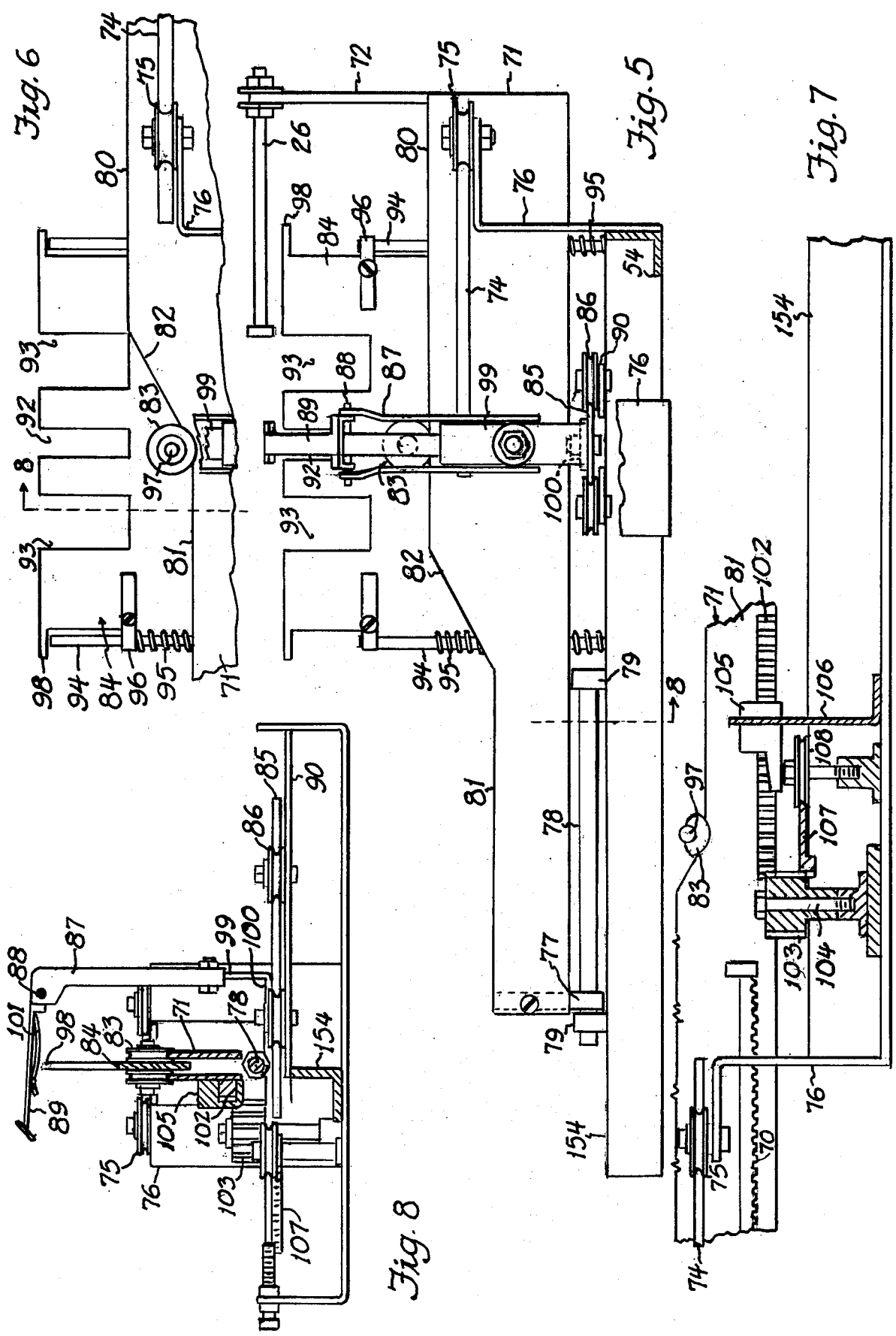

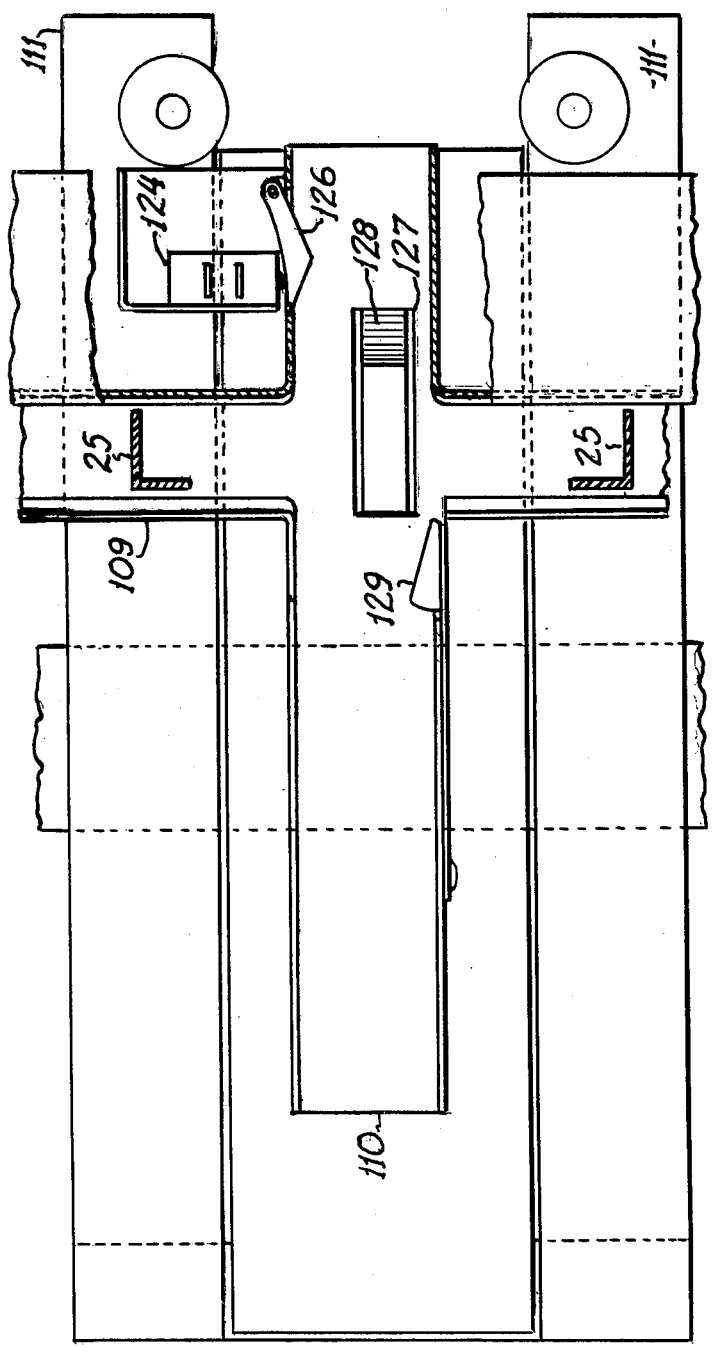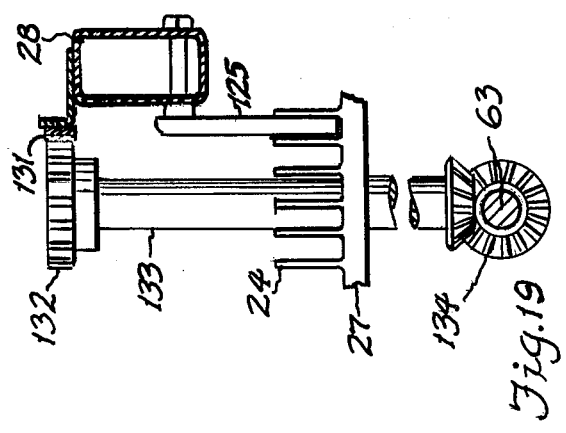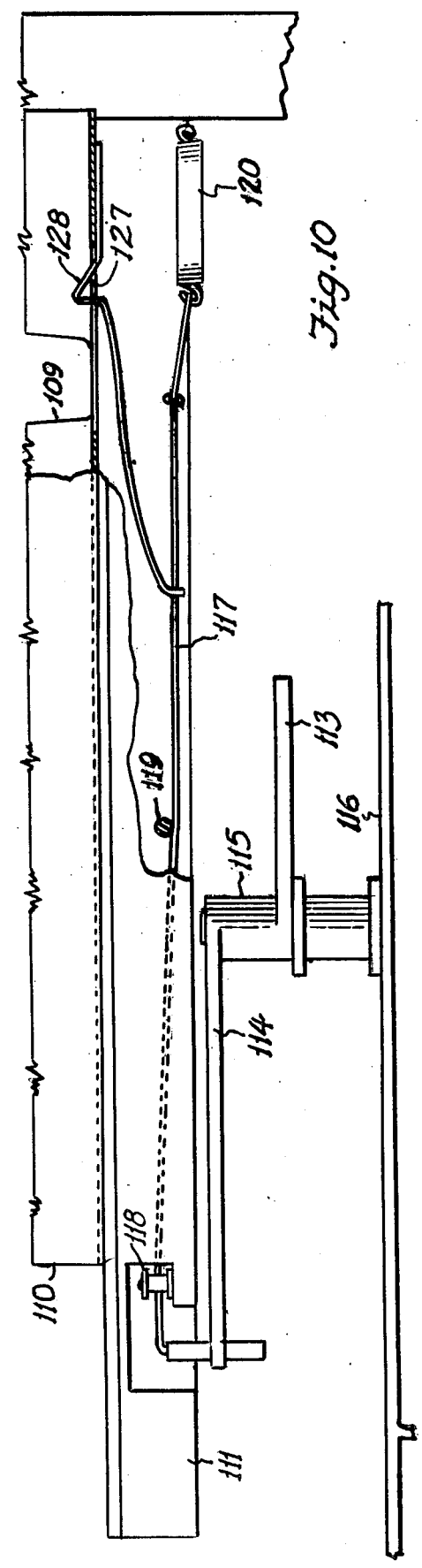

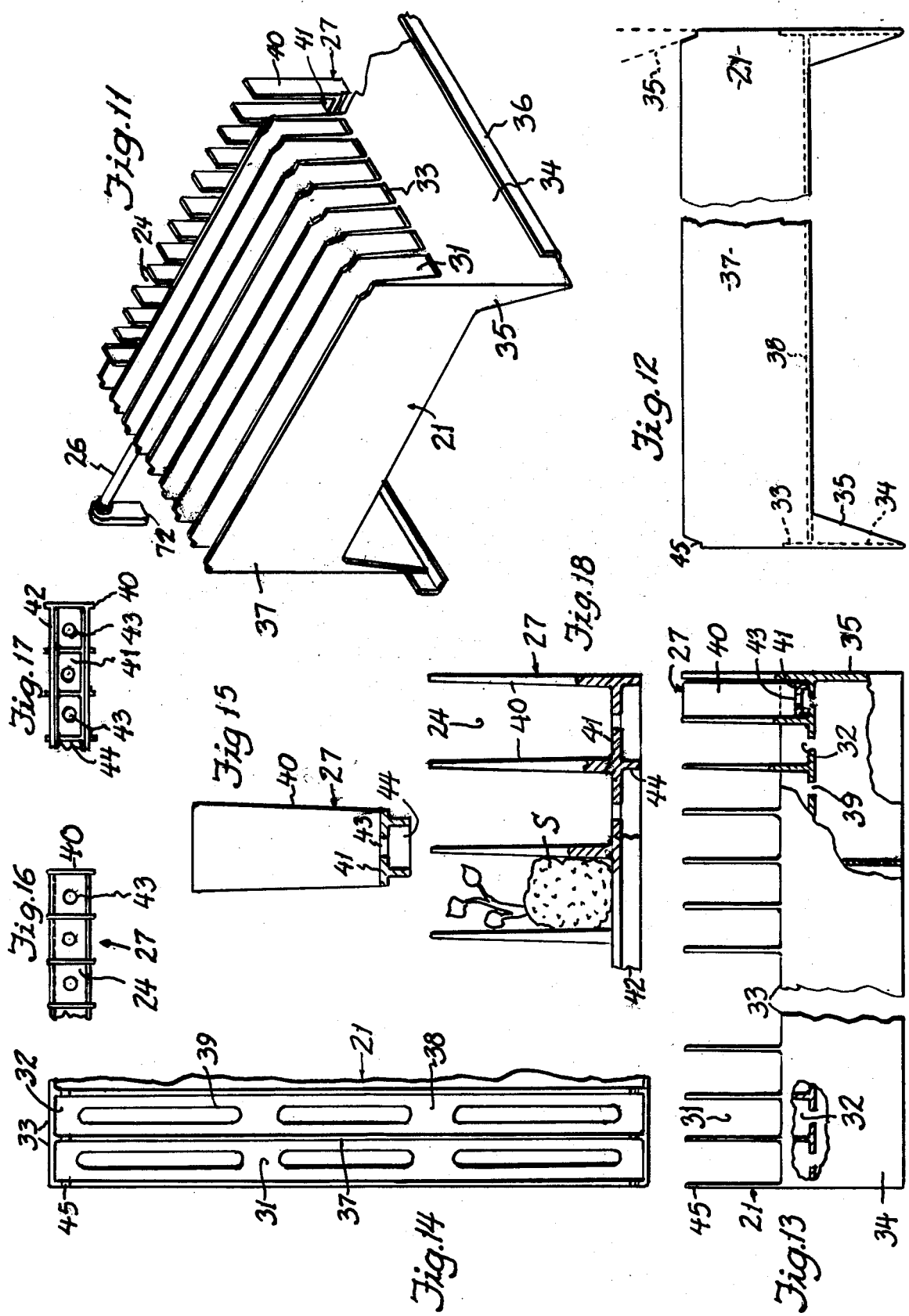

AUTOMATIC PLANT SETTING APPARATUS

This application is a continuation of my application Ser. No. 261,368, filed May 7, 1981, now abandoned.

OBJECTS OF THE INVENTION

The invention aims to provide an apparatus which is operative to automatically drop a succession of plant seedlings through a guide chute into a furrow dug by a plow point immediately preceding the chute. It is an object to provide a tray containing well over a hundred plants, and to facilitate replacement of an emptied tray be a full tray.

IN THE DRAWINGS

FIG. 1 is a frontal view of a planting machine embodying my invention;

FIG. 2 is a side view of the control mechanism of the same;

FIG. 3 is a frontal view showing the plant delivery chutes and control mechanism;

FIG. 5 is an elevational view of the ejector mechanism;

FIG. 6 is a fragmentary elevational view of the same, showing the ejector plate in its lowered position;

FIG. 7 is an elevational view of the side of the ejector mechanism opposite to the side viewed in FIG. 5;

FIG. 8 is a vertical sectional view taken on the line 8—8 of FIGS. 5 and 6;

FIG. 9 is a plan view of the distribution chute and associated parts;

FIG. 10 is a vertical elevational view of the same, partly in section;

FIG. 11 is a fragmentary perspective view of the plant holding tray with one of the plant container strips shown in partially ejected position;

FIG. 12 is a fragmentary end view of the tray;

FIG. 13 is a fragmentary side view of the tray, partially in section, with a cross-sectional view of one of the holding strips in one of the tray channels;

FIG. 14 is a fragmentary plan view of the tray;

FIG. 15 is a vertical cross section of one of the holding strips;

FIG. 16 is a plan view of a portion of a holding strip;

FIG. 17 is an inverted plan view of the same;

FIG. 18 is a fragmentary side view, partially in section, of a plant holding strip with a seedling plant shown in one of its pockets; and FIG. 19 is a vertical elevational view illustrating a modified form of the invention.

DETAILED DESCRIPTION OF THE INVENTION

Figure 4:
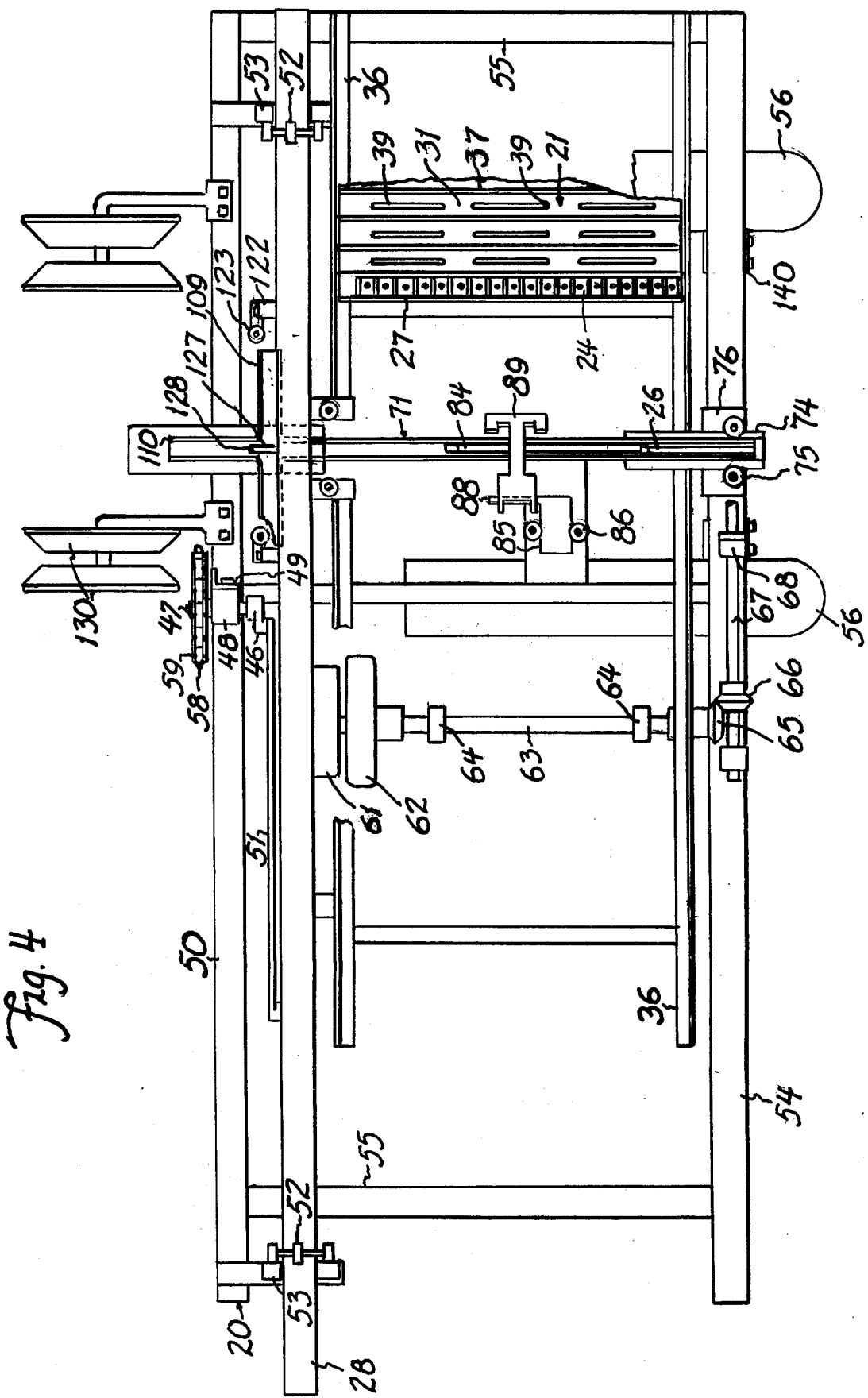
FIG. 4 is a plan view of the machine.

In general, the invention provides a frame 20, shown in front elevational view in FIG. 1, for carrying the cropping apparatus along a path on which a row or rows of seedlings are to be planted; a plant holding tray 21 supported on the frame 20 for advancing movement over a delivery chute or pair of chutes 22 carried by the frame; a plow point or pair of plow points 23 carried by the frame ahead of the chute or chutes 22, for digging a furrow or furrows into which the seedlings S (FIG. 18) are dropped periodically; a plant container strip 27 (FIGS. 11, 13 and 15–18) having a number of plant holding pockets 24 (FIG. 11) from which seedlings S (FIG. 18) are periodically ejected by an ejector finger or fingers 25 upon exposure of the pockets 24 beyond the end of a strip holding channel of the tray 21, initially by the pushing action of a plunger 26 (FIGS. 5 and 11) followed by action of a pawl 128 (FIGS. 4 and 9) pulling container strip 27 to a discharge position. A control bar 28 is reciprocated as the apparatus is moved over the ground along a furrow or furrows dug by plow points 23, and gearing 29, actuated by control bar 28, transmits reciprocating movements to a plunger 26 (FIGS. 1 and 4).

Tray 21 (FIG. 11) may be fabricated of molded plastic material. It comprises a plurality of channels 31 each having at its lower extremity a pocket 32 closed at each end of the channel by a side wall 33 which is an upward extension of a skirt 34. At the ends of the tray, and at equally spaced positions between the ends, are a plurality of braces 35 which hold the side walls 33 against deflection inwardly during operation of the apparatus, in which the lower edges of skirts 34 are supported by angle iron rails 36, for periodic shifting of tray 21 forwardly to bring successive channels 31 into position for movement of plant holding strips 27 laterally of rails 36 in order that plants held thereby can be successively released for delivery through chutes 22 into the furrows at spaced intervals.

Tray 21 embodies a plurality of parallel upstanding walls 37 which define between them the channels 31. The bottoms of channels 31 are defined by a bottom wall 38 FIG. 14 which has therein a number of parallel slots 39, several for each channel 31. Plant container strips 27 FIGS. 11 and 18 each embodies a plurality of upstanding fins 40 defining between them the plant holding pockets 24, a bottom wall 41 defining the bottoms of pockets 24, a pair of skirts 42 depending from bottom wall 41, and a plurality of apertures 43, one in the center of each pocket 24, for drainage of excess water through slots 39 of holding tray 21 during irrigation. A plurality of abutment walls 44 project downwardly from bottom wall 41, for engagement by a holding pawl (spring latch 128, FIGS. 9 and 10) for advancing strip 27 one pocket at a time during operation of the apparatus as the plants are successively discharged. The corners of tray walls 37 are notched at 45 to enable emptied trays to be stacked one upon another as indicated in FIG. 12.

The Carrying Machine

Carrying machine 20, 22, 23 etc. includes a crank 46 mounted on a shaft 47 which is journalled in a bearing 48 carried by an upright post 49 (FIG. 4) secured to and rising from a fixed frame bar 50 of carrying frame 20. A connecting rod 51 (FIG. 4) receives reciprocating motion from crank 46 and transmits it to control bar 28. Bar 28 is supported for reciprocating motion by bearing rollers 52 carried by posts 53 fixed to and rising from frame bar 50 (FIGS. 1 and 4). Frame 20 includes the bar 50 and a parallel bar 54 spaced from bar 50 and lying substantially in a common horizontal plane therewith. Frame 20 may further include suitable transverse bars 55 connecting longitudinal bars 50 and 54, and suitable travel supports such as drag shoes 56 (FIGS. 1 and 4). Locomotion may be provided by a farm tractor connected to the apparatus by a three-point hitch such as is commonly used in farming operations. Since such mechanism is well known, it is not illustrated herein. The moving parts of the apparatus are driven by a hydraulic motor 30. Hydraulic oil for driving motor 30 is delivered from the pulling tractor to the motor and returned to the tractor through hydraulic hose lines 57 (FIG. 1).

Reciprocating movement is transmitted to control bar 28 through connecting rod 51 from crank 46 which may be rotated by suitable means such as a sprocket 58 turned by a chain 59 receiving drive from motor 30 or other suitable means. A rack 60 secured to and depending from control bar 28 transmits oscillating movement to the drive element 61 of a normally open clutch (FIG. 4). Drive element 61 intermittently engages a driven element 62 of the clutch to drive a shaft 63 journalled in bearings 64. Shaft 63 drives a bevel gear 65, meshing with another bevel gear 66 which in turn drives a shaft 67 journalled in bearings 68 mounted on frame bar 54. Shaft 67 carries a spur gear 69 (FIG. 1) meshing with a short rack 70 which periodically transmits recirpocating movement to ejector plunger 26.

The ejector mechanism (FIGS. 5, 7 and 8) comprises a pair of spaced bars 71, laterally opposed in vertical planes, connected at one end by an upright finger 72 which, at its upper end, carries the horizontal ejector plunger 26. Secured to the outer faces of bars 71 are a pair of horizontally extending rails 74, embraced between peripherally grooved rollers 75 carried by brackets 76 rising from fixed frame bar 54. A slide finger 77 is secured between the other ends of bars 71 and slides on a rod 78 carried by a cross frame member 154, secured between lugs 79 on member 154.

Bars 71 (FIG. 5) have vertically spaced horizontal edges 80 and 81 joined by inclined ramps 82. Rollers 83, carrying a vertical slide plate ejector 84, travel on these upper edges of bars 71. A slide finger 85 (FIG. 4), slidable horizontally between rollers 86, carries vertical fingers 87 (FIG. 6) which, at their upper ends, support a hinge pin 88 on which is hinged an arm 89 projecting transversely over bars 71. Rollers 86 are mounted on a pair of mounting strips 90 which project horizontally from frame bar 154. Ejector slide plate 84, mounted for vertical movements between bars 71, has upwardly opening slots 92 and 93 (FIG. 6) the former adapted to receive arm 89 when it is lowered. Plate 84 is guided by vertical posts 94 rising from frame bar 154 and encircled by coil springs 95. Slide loops 96 incircle posts 94 loosely for sliding movement thereon. Rollers 83 are attached to plate 84 by pins 97. Plate 84 has at its upper corners, ears 98 functioning to limit downward movement of the plate by engagement with the upper ends of posts 94 (FIG. 6). Fingers 87 are vertically adjustable on an upwardly projecting arm of an L-bracket 99 (FIG. 8) which has a foot 100 secured to the slide finger 85. A leaf spring 101 (FIG. 8) is secured in the upper portions of fingers 87, and functions to hold arm 89 in an elevated position as shown. Arm 89 functions to advance tray 21 when a container strip 27 has been emptied and ejected from tray 21.

Referring now to FIGS. 7 and 8, a rack 102 is secured along the bottom margin of one of bars 71 and meshes with a pinion 103 which is mounted for rotation on a post 104 projecting upwardly from a mounting on lateral frame bar 154. Rack 102 is slidable in a bearing sleeve 105 attached to a bracket 106 projecting upwardly from a mounting on frame bar 154. Also meshing with pinion 103 is a rack bar 107 which moves transversely of spaced bars 71, beneath the same, and is guided between pinion 103 and flanged rollers 108 mounted on frame bar 154.

Referring now to FIGS. 9 and 10 as well as FIGS. 2 and 3, a distribution chute comprising a horizontal channel 109 disposed beneath and parallel to reciprocating control bar 28, and a horizontally disposed intersecting channel 110, is mounted on a pair of laterally spaced channel bars 111. A lever having a lower arm 113 (FIG. 2), an upper arm 114 and an intermediate hub 115, is mounted for oscillating movement on a pedestal secured upon a support 116. Upper arm 114 is attached to one end of a pull wire 117 which is guided between small rollers 118 and beneath a spacer 119, and is attached at its other end to a pawl 128 and to a coil spring 120 which is in tension so as to maintain arms 113 and 114 normally parallel to frame bars 111. Support 116 is mounted on a pair of legs 121 rising from frame bar 50. An arm 122 (FIG. 3), secured to and projecting downwardly from reciprocating bar 28 (FIG. 1) has at its lower end a roller 123 which, as bar 28 reciprocates, will engage lever arm 113 (FIGS. 2 and 3) to oscillate the same laterally, the arm being returned to its normal position by a coil spring 120. A duplicate arm 122 (FIG. 4) may be utilized to deflect lever 113, 114 in an opposite direction when chute 22 is used to plant a row parallel to the one shown.

A micro switch 124 (FIG. 9) is mounted at the short end of channel 110 and functions to close magnetic clutch 61, 62 when closed. A tripper finger 126 is hinged to the channel wall, disposed in a slot therein, and functions to engage and open the normally closed switch 124 when a plant container strip 27 is present in the channel. When the rear end of a strip 27 passes the tripper finger, the circuit is closed, thus engaging the magnetic clutch 62, and the entire mechanism is connected for operation.

In the bottom of channel 110 (FIG. 10) is a slot 127, through which a spring latch pawl 128 projects upwardly for engagement with a plant container strip 27 to periodically hold it against movement. A spring latch 129 (FIG. 9) engages strip 27 to assist in holding it. Latch 128 slides when pulled by wire 117, and is returned by spring 120 when arm 113 is disengaged by a roller 123.

Modified Form of the Invention

Referring now to FIG. 19 (adjacent FIG. 9), reciprocable bar 28 carries a rack 131 meshing with a pinion 132 on the upper end of a shaft 133 which drives a bevel gear 134 on the shaft 63 of clutch element 61. Secured to and depending from bar 28 is a finger 125 which extends into successive pockets 24 of plant container strip 27 and sweeps successive plants S out of the pockets for dropping through delivery chute 22. The mechanism for advancing container strip 27, including ejector 26, is as previously disclosed.

Operation

Referring to FIG. 1, it may be noted that a frontal view of the apparatus is disclosed therein, the machine being preceded by a tractor which simultaneously drags it over a previously prepared ground surface and pumps hydraulic oil under pressure to and from the hydraulic motor 30 through hoses 57. Rows for receiving the plants are dug by plow points 23 immediately ahead of the plant delivery chutes 22. The flow of hydraulic oil from the tractor to motor 30 determines the speed of rotation of the motor and therefore the distance between plants that are dropped into the rows. The hoses 57 may easily be disconnected from the tractor by easy snap on and off couplings. The drag shoes 56 will travel over irregularities in the ground surface while maintaining the machine in a relatively stable position vertically relative to the ground. The shoes 56 are attached to plow points 23 as shown or in any other suitable manner, and maintain the same relation thereto as the plow points are adjusted for spacing, as by means of clamps 140 having means for clamping them on bar 54, or loosening them for adjustment. Chutes 22 are attached to the respective ends of channel 109 of the distribution chute by hinges 141 (FIG. 3) for outward or inward swinging adjustments, to satisfy the practices of different farmers and the requirements for various crops to be planted. Plow points 23 of course are always positioned directly ahead of the delivery ends of chutes 22.

When the rear end of plant container strip 27 passes the tripper 126 of micro-switch 124 (FIG. 9) the circuit is closed, thus engaging magnetic clutch 62, 61, and the entire mechanism of the apparatus is connected for operation. The oscillating motion of control bar 28 will be transmitted by clutch 61, 62 through parts 63, 65, 66, 67 and 69 to advance assembly 70, 71, 72, 80, 81, 82, 26, 105 and 102. As this assembly advances, roller 83 will roll downwardly along ramp 82, whereby vertical ejector 84 (FIG. 8) will be pulled downwardly. As rollers 83 reach the lower level along edges 81, whereby ejector 84 is at its lowest level, it will be below the level of the bottom of floor 38 of tray 21, and at this point rack 102 will engage pinion 103 and pull the assembly of rack bar 107, bracket 99, finger 87, arm 89 and spring 101 in an advancing direction. Pawl 89, which is hooked to the middle slot of tray 21, will then pull and advance the tray. On the return oscillating motion of actuating bar 28, the entire assembly will reverse its motion, pawl 89 and its assembly retracting, roller 83 and ejector 84 moving upwardly as they climb ramp 82, and ejector 84 entering the three slots 39 of tray 21, thereby elevating plant strip 27 sufficiently to clear the wall 33 of the tray. At this instant, horizontal ejector 26 will push the plant strip 27 into channel 110. As the leading end of strip 27 engages the tripper 126 of micro switch 124 (FIG. 9), the circuit will be opened and magnetic clutch 61, 62 will become disengaged. The pawl 128 functions to advance plant strip 27 one pocket space at a time until the strip's rear end clears the tripper 126, and the cycle is then repeated.

In the operation of the advancing mechanism including pawl 128, bar 28, as it reciprocates, will transmit oscillating motion to parts 61, 62, 63 and 69 (FIG. 4), and reciprocating motion to fingers 25 and rollers 123, caried by arms 122 (FIG. 1). As bar 28 moves to extreme left or right position, a roller 123 will engage and move lever arm 113 (FIG. 2) causing lever mechanism 113, 114 to swing around pivot 115, arm 114 will pull on wire 117, which will transmit the pull to spring latch 128, sliding it in slot 127 FIGS. 1 and 4. Latch 128, in turn, will engage and pull against an abutment wall 44 (FIG. 17) of plant strip 27, to advancethe strip one pocket space along channel 110. It is essential that finger 25 has cleared the channel 110 before roller 123 begins to push on lever arm 113. Upon the return of finger 25 as it travels in channel 109, the seedling S will be extracted from its pocket in holding strip 27, and dropped into chute 22 (FIG. 3), which will guide the seedling, as it falls, into furrow 25 behind the plow point 23. Chute 22 is preferably provided with a longitudinal slot 112, functioning as a window through which the operator, by glancing rearwardly, may observe the dropping of plants through the chute. Two wheels 130 (FIG. 4), immediately following each chute 22 and running along the ground surface, will press both sides of the furrow and cause it to close, thereby covering the base of each seedling as it is dropped.

When roller 123 becomes disengaged from lever arm 113, spring 120 will return latch pawl 128 to its normal position shown in FIG. 9. The assembly of advancing means shown in FIG. 10 can be replaced by a gear-driven pawl, eliminating parts 113–115, 117, 118, 120 and 123. The operation will be similar to that described, and motion will be the same.

In FIG. 19, parts 131-133 are substituted for parts 60–62 of FIGS. 1 and 4. This assembly is mounted vertically and more directly to bar 28. A solenoid may be used to engage rack 131 to gear 132 by swinging an idler gear into mesh with the gears. In either system, whether a solenoid or magnetic clutch is employed, the electrical circuit will be the same. If the vertical assembly is used, rack gear 70 of FIG. 5 will be mounted on a bar 71. The driving rack 70 will be moved accordingly.

Referring to FIG. 15, it will be noted that fins 40 are provided with upwardly diverging side edges. This is to facilitate vertical lift of plant container strip 27 sufficiently that its skirts 42 may ride on the upper edge of side wall 33 when strip 27 is ready for ejection of its contained plants. This shape also conforms more closely to the shape of the ball of soil carried by each plant S.

FIG. 18 illustrates the wedge shape of fins 40, which are tapered upwardly for stronger construction and easier extraction of plants than would be possible if they were of uniform thickness.

It may be noted that bottom 41 (FIG. 15) extends beyond skirts 42 at both sides, thus shielding the advancing pawl 128 from debris, planting material and dirt during plant extraction. The overhang of the bottom also serves to accommodate tripper 126 of the electrical circuit.

Walls 42 are parallel and rigid to prevent bending or flexing of strip 27. This is essential for the reason that any deformity of the strip will jam the extracting mechanism of the apparatus.

I claim as my invention:

1. Mobile apparatus, for advancing, singulating and planting seedlings growing in strips, comrising:

a frame having means for travel along a path on an earth surface to be planted;

means for opening the earth at predetermined locations along the path for implanting seedlings;

a plurality of plant container strips each having a plurality of upwardly and laterally opening pockets each adapted to contain a seedling plant;

said strips each having a bottom wall provided with a plurality of abutments projecting downwardly therefrom and spaced longitudinally of said strip the same as the spacing of walls defining said pockets;

a tray having parallel guide walls between which said strips are guided for sequential advancing movements parallel to said path of travel in order to sequentially position successive pockets at a predetermined discharge point of said frame;

means successively engageable with said abutments for effecting said sequential movements in response to said travel in order to successively position said pockets at a oredetermined discharge point in said frame;

a powered bar means carried by said frame for reciprocating movements in response to said travel of said frame;

a downwardly projecting finger carried by said bar for sequentially sweeping plants laterally out of said pockets as said bar is reciprocated;

said tray having barrier walls extending upwardly at the ends of said guide walls and effective to engage succeeding strips to retain them against advancing movements;

means for lifting one of said strips to a height such as to allow a following strip to be extended over a barrier wall when a previous strip is discharged;

and a pair of spaced parallel rails in which said tray is supported and guided for advancing movements transversely of said path to position a suceeding strip for consecutive movements parallel to said path, said rails having upwardly extending flanges retaining said tray.

2. Apparatus as defined in claim 1, wherein said means for transmitting reciprocating movements comprises a crank adapted to rotate through 360°, and a rod connecting crank to said bar.

3. Apparatus as defined in claim 1, said means for lifting said one strip comprising a pair of plate-like bars disposed in spaced parallel vertical planes;

each of said bars having horizontal upper and lower edges and an inclined ramp edge connecting said horizontal edges;

a pair of rollers riding on said edges and a vertical slide plate carried by said rollers and shiftable vertically when said rollers move on said inclined ramp edges;

said tray having in its bottom a longitudinal slot adapted to receive said slide plate, whereby said slide plate may project upwardly to lift said plant container strip sufficiently to clear the edge of said tray for ejection of the strip from the tray.

4. Apparatus as defined in claim 1, further including: drive means and means receiving reciprocating movement therefrom:

a rack carried by said last mentioned means;

a normally open clutch including a drive element receiving oscillating movement from said rack;

and an ejector plunger receiving reciprocating movement from the driven element of said clutch, to initiate the movement of said plant container strip in said tray space.

5. Apparatus as defined in claim 1 said apparatus further including:

pockets;

a spring latch yieldably engaging said abutment walls successively to hold said strip in each position of advancement, said latch projecting upwardly through said strip holding and guiding means and engaging said strip from below.

6. Apparatus as defined in claim 1, further including means providing upper and lower substantially horizontal roller tracks and an inclined track joining said tracks;

roller means for travel along said tracks between upper and lower positions;

a slide plate connected to said roller means for vertical movements corresponding to said roller means travel between said upper and lower positions;

and means responding to movements of said plate to said lower position to advance said tray to succeeding positions for locating respective plant container strips in operative location for plant discharge;

said tray having in its bottom a longitudinal slot adapted to receive said slide plate, whereby said plate may project upwardly to lift said container strip sufficiently to clear the edge of said tray for ejection of said strip from said tray.

7. Apparatus as defined in claim 1, further including means providing a guide path extending downwardly from said discharge point for guiding the discharged plants downwardly to planting points in the earth along said path.

* * * * *